United States Patent [19]

Coombes

[11] Patent Number: 4,764,683

[45] Date of Patent: Aug. 16, 1988

[54] WIND POWERED ELECTRIC GENERATOR

[75] Inventor: Donald E. Coombes, Baker, Oreg.

[73] Assignee: Lloyd A. Smith, Baker, Oreg. ; a part interest

[21] Appl. No.: 80,920

[22] Filed: Aug. 3, 1987

[51] Int. Cl.⁴ .............................. F03D 7/00; F03D 9/00
[52] U.S. Cl. .................................. 290/55; 416/197 A;
416/DIG. 4; 415/2 A; 415/60; 290/44
[58] Field of Search ....................... 290/54, 43, 55, 44,
290/; 416/197 A, DIG. 4; 415/2 R, 3 R, 2 A,
60, 213 R

[56] References Cited

U.S. PATENT DOCUMENTS

| 4,037,983 | 7/1977 | Poeta | 415/3 R X |
|---|---|---|---|
| 4,156,580 | 5/1979 | Pohl | 290/55 X |
| 4,265,086 | 5/1981 | Bahrenburg . | |
| 4,288,200 | 9/1981 | O'Hare | 415/2 R |
| 4,293,274 | 10/1981 | Gilman . | |
| 4,369,629 | 1/1983 | Lockwood | 416/DIG. 4 |

FOREIGN PATENT DOCUMENTS

| 2300235 | 10/1976 | France | 416/197 A |
|---|---|---|---|
| 157071 | 9/1982 | Japan | 416/197 A |

Primary Examiner—William M. Shoop, Jr.
Assistant Examiner—Sharon D. Logan
Attorney, Agent, or Firm—Laubscher & Laubscher

[57] ABSTRACT

An improved wind powered generator includes a streamlined housing rotatably connected with a fixed base and a pair of helical rotors rotatably connected with the housing for driving a pair of electric generators when the rotors are rotated by the wind. The housing includes forward and rear nacelles which define vertical side openings in the housing in which the rotors are arranged, with the helical vanes thereof partially protruding from the housing. The nacelles serve to direct the wind stream against the rotor vanes with minimal disturbance, whereby the helical rotors capture the maximum amount of kinetic energy from the wind for conversion to electricity.

10 Claims, 3 Drawing Sheets

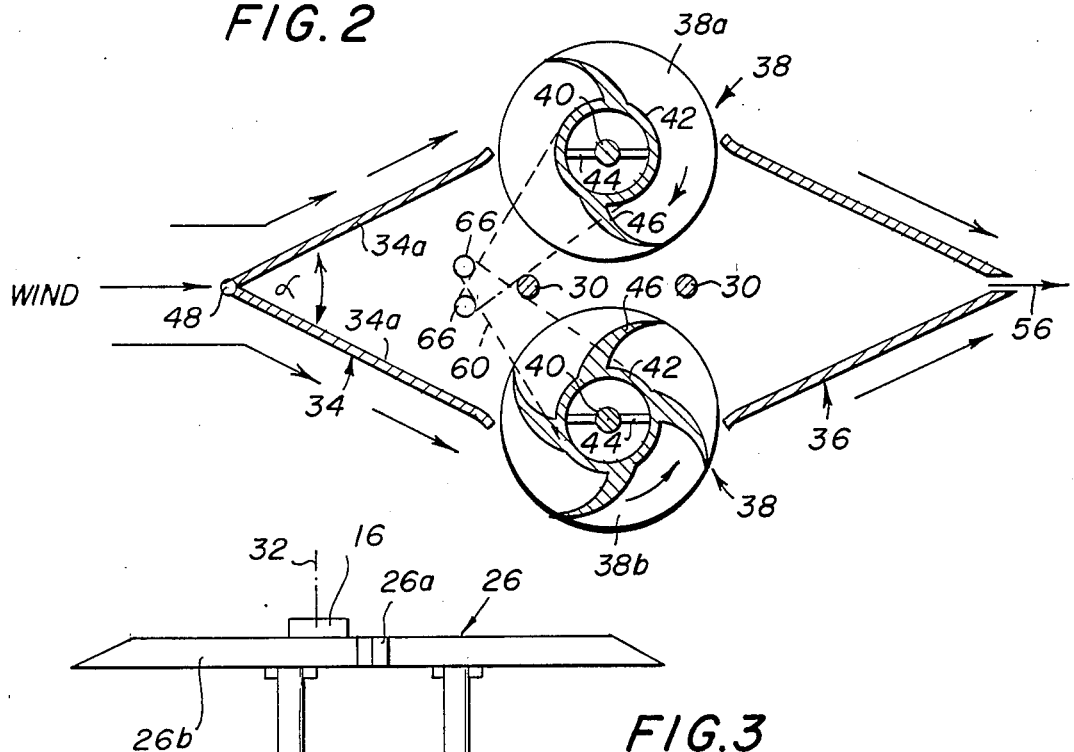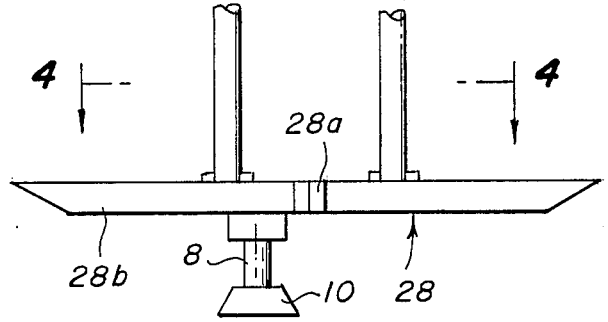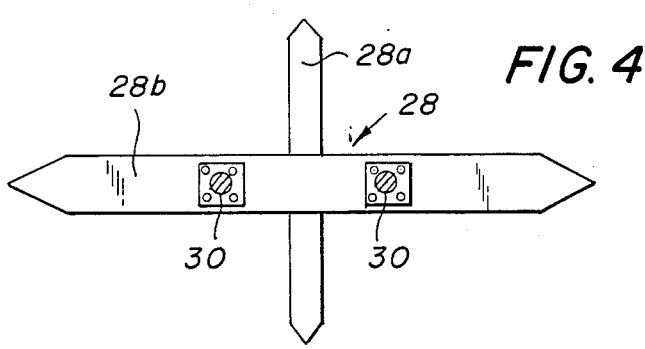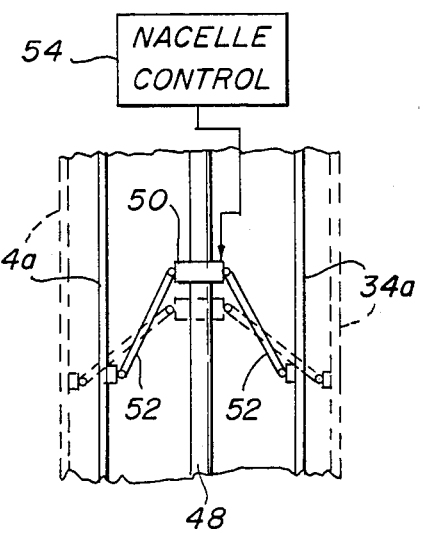

WIND POWERED ELECTRIC GENERATOR

BACKGROUND OF THE INVENTION

The present invention relates to an improved assembly for driving a generator to generate electricity using the energy in a fluid current, particularly wind. The kinetic energy of the wind is harnessed by a unique double helical rotor assembly which is driven by the wind to in turn drive one or more electric generators.

BRIEF DESCRIPTION OF THE PRIOR ART

The kinetic energy of blowing wind has long been converted to mechanical energy, such as by a windmill, to operate a pump, grind grain and the like.

A major drawback of the windmill type devices is that in order to harness enough energy to drive an electric generator, the windmill has to be excessively large and located in an area of high constant wind. The size of the conventional blades results in a constant chopping sound which is distracting and becomes unpleasant and uncomfortable after a short period of time of operation.

Accordingly, attempts have been made to improve upon conventional windmills by providing wind energy harnessing devices having various blade configurations as evidenced by the U.S. Pat. Nos. 4,156,580 Pohl, 4,265,086 Bahrenburg, 4,293,274 Gilman, and 4,369,629 Lockwood. The Pohl patent for example discloses a vertical axis wind turbine including a pair of prismatic rotors mounted behind a wind deflecting shield of a tower structure. The Gilman patent also discloses a vertical axis wind turbine having a single rotor including helical vanes.

While the prior devices normally operate satisfactorily, they each possess certain drawbacks which limit their efficiency with regard to energy conversion. This is generally due to the inability to properly direct the wind against the rotors to maximize rotor rotation for energy conversion. Gilman provides adjustable vanes for capturing the wind in accordance with the amount of wind present. Pohl provides a forward deflector which, owing to its non-aerodynamic configuration, actually diffuses and thus diminishes the wind stream or current. Moreover, the prism configuration of the rotors of the Pohl device produces a beating or chopping sound during operation, much like the blades of a helicopter, which is environmentally unpleasant.

The present invention was developed in order to overcome these and other drawbacks of the prior wind generators by providing a streamlined device of maximum efficiency which quietly converts wind or other fluid current energy into electricity.

SUMMARY OF THE INVENTION

Accordingly, it is a primary object of the present invention to provide a wind or other fluid current driven electric generator including a base, a vertically arranged housing rotatably connected with the base, a pair of helical rotors rotatably connected with the housing, and an assembly for coupling the rotors with an electric generator, whereby rotation of the rotors by the wind drives the generator to produce electricity. More particularly, the housing comprises forward and rear nacelles, with the forward nacelle facing the wind. At each side of the housing is a vertical opening defined between the forward and rear nacelles. Within each opening is arranged a rotor having one or more helical vanes, with the rotors being rotatably connected with the housing and protruding at least partially exteriorly thereof, whereby the vanes intercept the wind stream delivered to the openings by the forward nacelle. The rear nacelle contains at least one opening in the rearwardmost edge thereof to vent the fluid pressure created within the housing as a result of rotation of the rotors.

According to a more specific object of the invention, each rotor comprises a vertically arranged axial shaft with a tubular body concentrically arranged relative to the shaft. The tubular body serves to direct and compress the airflow onto the helical vanes of the rotors to increase efficiency.

It is a further object of the invention to provide an adjustment mechanism operable to transversely adjust the walls of the forward nacelle to control the degree of protrusion of the rotor vanes into the wind stream, thereby controlling the maximum output of the rotors for a given wind speed.

According to yet another object of the invention, the housing includes a rigid framework with which the forward and rear nacelles and the rotors are connected. The framework is connected with the base via bearings, whereby the housing is free to rotate into the wind much like a weathervane so that the maximum volume of wind is intercepted by the rotors. A brake and snubbing assembly is connected between the base and the housing relative to the base to prevent the housing from yawing or to lock the housing in a given orientation.

BRIEF DESCRIPTION OF THE FIGURES

Other objects and advantages of the subject invention will become apparent from a study of the following specification when viewed in the light of the accompanying drawing, in which:

FIG. 2 is a sectional view of the housing of the wind powered generator taken along line 2—2 of FIG. 1;

FIG. 3 is a side plan view of the housing framework;

FIG. 4 is a sectional view of the framework taken along line 4—4 of FIG. 3.

FIG. 5 is a partial rear plan view of the front nacelle adjustment mechanism.

DETAILED DESCRIPTION

Figure 1:
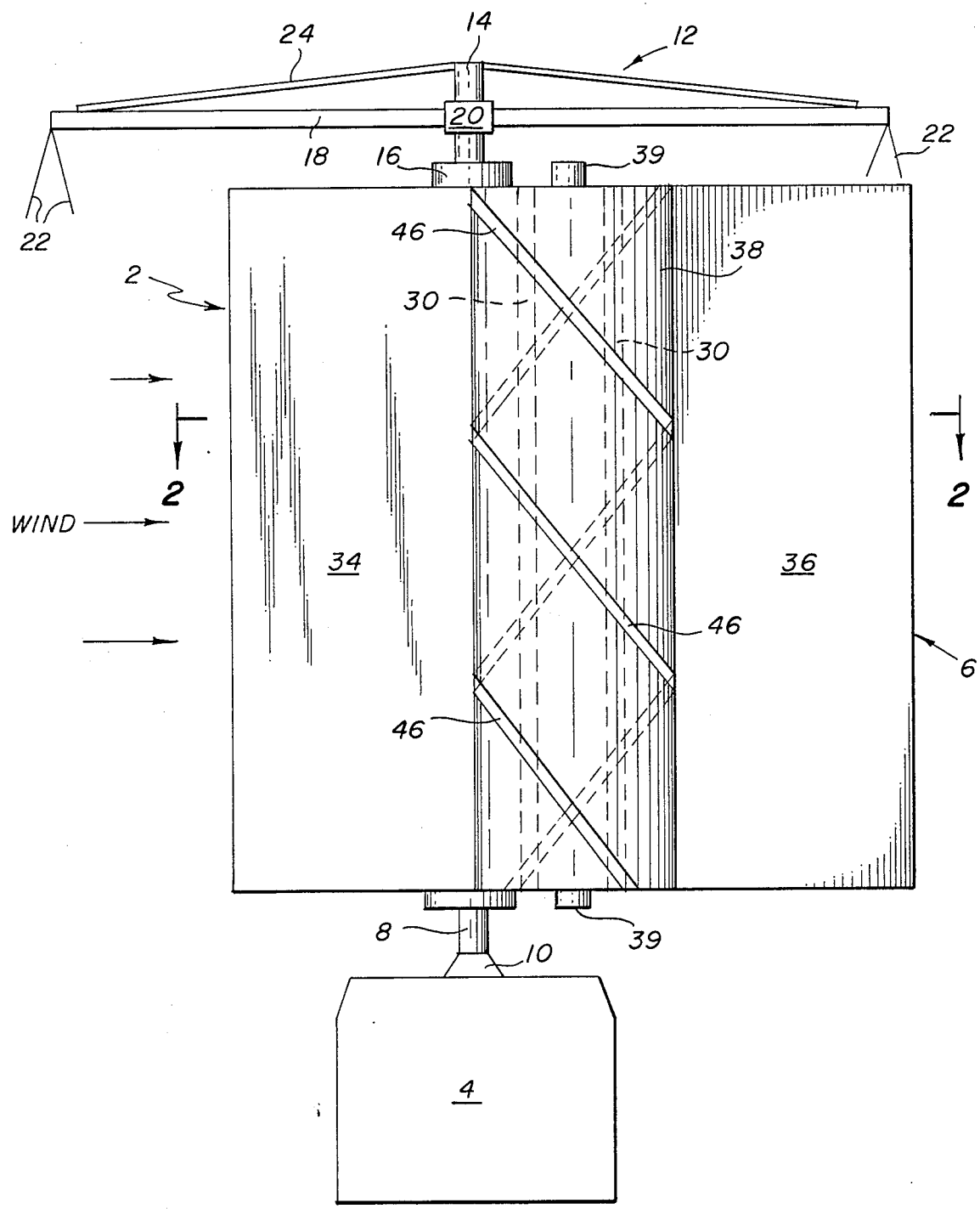
FIG. 1 is a side plan view of the wind powered generator according to the invention.

As shown in FIG. 1, the wind power generator 2 of the present invention includes a fixed base 4 and a vertical housing 6 rotatably connected therewith. More particularly, the housing is tapered and includes a lower vertical shaft 8 connected with the base 4 via a bearing and unit lock-down brake assembly 10. In order to stabilize the top of the housing, a fixed stabilizer assembly 12 is provided. The stabilizer assembly includes a vertical shaft 14 connected with the top of the housing 6 via a bearing 16 and a spider assembly including longitudinal and lateral cross pieces 18, 20 connected with the shaft 14. The ends of the cross pieces 18, 20 have guy wires 22 connected therewith for anchoring the stabilizer assembly 12 with the ground or other support. Struts 24 are connected between the ends of the cross pieces and the shaft 14 to increase stability.

Referring now to FIGS. 3 and 4, the housing 6 comprises a rigid framework connected with the bearings.

The framework essentially comprises upper and lower crosspieces 26, 28 and a pair of vertical struts 30 connected therebetween. As shown in FIGS. 1 and 3, the vertical axis of rotation 32 of the housing relative to the base and spider is parallel to but forward of the geometric vertical axis of the housing. As will be developed below, this arrangement assists the housing to rotate to face or find the wind direction in the same manner as a weathervane.

Referring now to FIGS. 1 and 2, the housing 6 also includes a forward nacelle 34 and a rear nacelle 36 connected with the framework, with the forward nacelle being that which faces the wind as shown by the arrows. The nacelles each have an aerodynamic or streamlined outer surface configuration to provide undisturbed airflow across the surface of the housing. At the sides of the housing are vertical openings defined between the front and rear nacelles. Arranged within each opening is a rotor 38 having a vertical axial rotor shaft 40 connected with the lateral portions 26a, 28a of the upper and lower framework crosspieces 26, 28. More particularly, the rotor shafts are connected with the housing framework by bearing and brake assemblies 39, whereby the rotors rotate relative to the housing. The rotors 38 also include a cylindrical tube 42 connected with the shaft 40 by horizontal spokes 44. Connected with the outer surface of the tubes, and preferably formed integrally therewith are a plurality of helical vanes 46. In the embodiment shown in FIG. 2, one rotor 38a has two vanes while the other rotor 38b has four vanes.

The rotors are mounted on the housing framework such that the rotor vanes 46 partially protrude exteriorly of the housing as shown in FIG. 2 to intercept the wind delivered off of the rear edge of the forward nacelle. The wind thus rotates the rotors in opposite directions, with the speed of rotation being a function of the speed of the wind and of the degree of protrusion of the vanes exteriorly of the housing.

The degree of protrusion of the rotor vanes is controlled through an adjustment of the transverse orientation of the walls 34a of the forward nacelle. More particulaly, the walls 34a are connected at their forward edges by a vertical hinge 48 as shown in FIG. 2 to define an angle α therebetween. An adjustment mechanism, shown in detail in FIG. 5, is connected with the forward nacelle walls to vary the angle α therebetween. A vertical post 48 is connected between the longitudinal members 26b, 28b of the housing frame upper and lower cross pieces. A movable collar 50 is mounted on the post 48 and struts 52 are pivotally linked between the collar and the inner surface of the forward nacelle walls 34a. A nacelle control device 54 controls the vertical movement of the collar 50 relative to the post 48. As the collar moves downwardly from the position shown in FIG. 5, the struts are extended outwardly to increase the angle α between the walls 34a thereby spreading the walls transversely outwardly and concealing a greater portion of the rotor vanes. When the collar is moved upwardly, the walls are drawn inwardly, whereby the rotor vanes protrude a greater degree exteriorly of the housing.

Referring once again to FIG. 2, it is seen that the rear nacelle contains at the rearwardmost edge thereof at least one opening 56. This opening serves to vent or siphon off high pressure air trapped with the housing as a result of rotation of the rotors. The vent opening thus allows the rotors to rotate more freely and also contributes to a smooth air flow at the rear of the housing.

Figure 6:
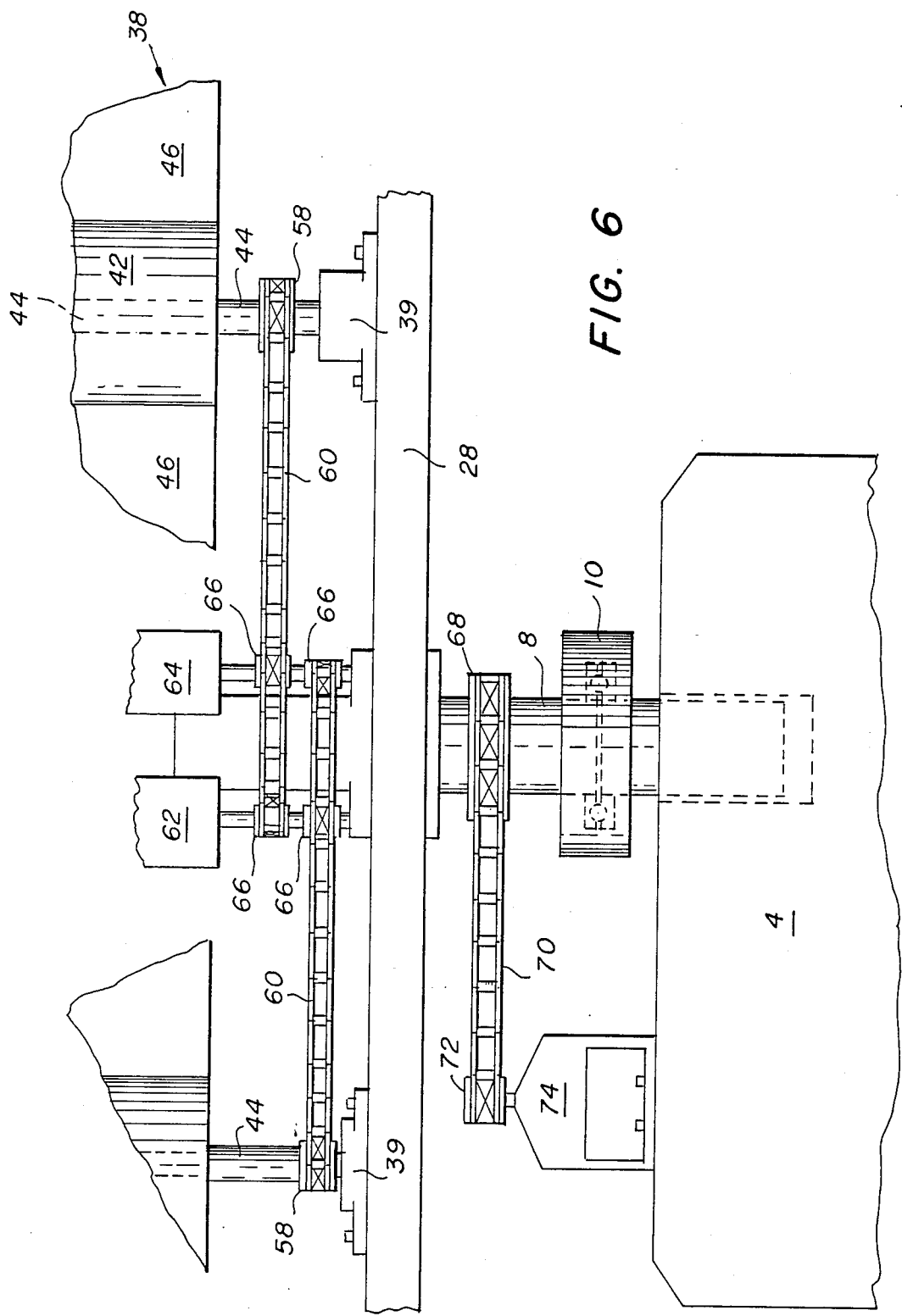
FIG. 6 is a partial detailed view of the housing brake and snubber assembly and of the mechanism for coupling the rotors with a pair of electric generators.

FIG. 6 illustrates in detail how the rotary energy from the rotors is coupled to electric generators. The shaft 44 of each rotor includes a sprocket 58 which rotates with the rotor shaft. A pair of chains 60 is connected with and driven by the rotor sprockets, and a pair of generators 62, 64 is connected with the housing frame lower cross piece 28. Each generator includes an input drive shaft having sprockets 66 connected therewith. The chains 60 from the rotor sprockets are connected with the generator sprockets to drive the input shafts thereof. The orientation of the chain and sprocket drive coupling mechanism is also shown schematically in FIG. 2. Owing to the chain drive path, the oppositely rotating rotors both drive the generator input shafts in the same direction.

Also shown in FIG. 6 is a brake and snubbing assembly for the housing. The housing shaft 8 includes a sprocket 68 which is connected via a chain 70 with the sprocket 72 of a hydraulic snubber 74 connected with the base 4. The snubber can be controlled to limit the degree of rotation of the housing shaft 8 and thus the housing relative to the base to prevent the housing from yawing in a variable wind. Moreover, the snubber can be locked in a given position to brake or arrest all rotary movement of the housing relative to the base. The snubber may be controlled either manually or automatically to provide manual or automatic braking, such as in storm conditions or when repair is required.

While the invention has been described for use primarily as a device for converting wind energy into electricity, it may be adapted for use in any moving fluid current such as water. In this environment, it may be beneficial to mount the device horizontally facing the direction of fluid flow since it is desirable to locate the device in an area where the flow is uniform and preferably at its highest value.

An important benefit realized from using rotors with helical vanes is that the lifting action is created within the nacelles upon rotation of the rotors. This creates an updraft out of the top of the nacelles which reduces air pressure on the inside blades. Reduced drag on the vanes increases rotor speed which is an important factor in light winds. The lifting action also reduces the load on the base rotor shaft bearings which reduces maintenance costs.

While in accordance with the provisions of the patent statute the preferred forms and embodiments of the invention have been illustrated and described, it will be apparent to those skilled in the art that various changes and modifications may be made without deviating from the inventive concepts set forth above.

What is claimed is:

1. Apparatus for driving an electric generator in response to fluid currents such as wind, water, and the like, comprising
    (a) a fixed base;
    (b) a vertical housing rotatably connected with said base, said housing including tapered front and rear portions with said front portion facing the fluid current and terminating in a vertical edge having a pointed horizontal cross-sectional configuration, aid side portions containing vertical openings extending the length of said housing and defined between said front and rear portions;
    (c) vertical rotor means arranged within said housing openings and rotatably connected with said housing, said rotor means including at least one helical vane protruding partially exteriorly of said housing, whereby fluid current passing said housing strikes the vanes to rotate said rotor means; and (d) means for coupling said rotor means with at least one generator, whereby rotary movement of said rotor means drives the generator to produce electricity.

2. Apparatus as defined in claim 1, wherein said rotor means comprises a pair of rotors each being arranged in a housing opening on opposite sides thereof, respectively, said rotors each containing an axial rotor shaft and a tubular body concentrically arranged relative to said shaft, said helical vanes extending outwardly from the outer surface of said tube.

3. Apparatus for driving an electric generator in response to fluid currents such as wind, water, and the like, comprising (a) a fixed based;
(b) a vertical housing rotatably connected with said base, said housing including
  (1) streamlined front and rear nacelles with said front nacelle facing the fluid current; and
  (2) side portions containing vertical openings extending the length of said housing and defined between said front and rear nacelles;
(c) a pair of rotors each arranged within a housing opening on opposite sides thereof, respectively, and rotatably connected with said housing, each of said rotors including an axial rotor shaft, a tubular body concentrically arranged relative to said shaft, and at least one helical vane extending outwardly from the outer surface of said tube and protruding partially exteriorly of said housing, whereby fluid current passing said housing strikes said vanes to rotate said rotors; and
(d) means for coupling said rotors with at least one generator, whereby rotary movement of said rotor means drives the generator to produce electricity. arranged in a housing opening on opposite sides thereof, respectively, said rotors each containing an axial rotor shaft and a tubular body concentrically arranged relative to said shaft, said helical vanes extending outwardly from the outer surface of said tube.

4. Apparatus as defined in claim 3, wherein said rear housing nacelle contains at least one opening in the rearwardmost edge thereof to vent any fluid pressure generated within said housing as a result of rotation of said rotors.

5. Apparatus as defined in claim 3, wherein said forward housing nacelle is adjustable in a direction transverse to the current direction, thereby to control the degree of protrusion of said rotor vanes into the current stream.

6. Apparatus as defined in claim 5, wherein said generator coupling means comprises a chain and sprocket drive assembly including a plurality of sprockets connected with said rotors and the generator, respectively, and at least one chain connected between said sprockets.

7. Apparatus as defined in claim 6, wherein said housing includes a rigid framework comprising upper and lower crosspieces with which said nacelles and rotors are connected and vertical interior struts connected between said upper and lower crosspieces.

8. Apparatus as defined in claim 5, wherein said base includes a rigid spider assembly for supporting the top of said housing.

9. Apparatus as defined in claim 8, and further comprising bearing means rotatably connecting said housing with said base and spider assembly, respectively, whereby said housing is free to rotate in accordance with the changes in the direction of the fluid current in order to maintain said housing front portion facing the fluid current.

10. Apparatus as defined in claim 9, and further comprising a brake and snubbing assembly connected between said base and said housing to control the rotational movement of said housing relative to said base.

* * * * *